(12) United States Patent
Werrbach, III et al.

(10) Patent No.: US 6,185,942 B1
(45) Date of Patent: Feb. 13, 2001

(54) RAPID FOOD COOLING APPARATUS AND METHOD OF USE

(76) Inventors: George A. Werrbach, III, 245 B Ross Hill Rd.; Steven A. Persson, 10 A Hanna Dr., both of Charlestown, RI (US) 02813

(*) Notice: Under 35 U.S.C. 154(b), the term of this patent shall be extended for 0 days.

(21) Appl. No.: 09/411,097

(22) Filed: Oct. 4, 1999

(51) Int. Cl.$^7$ .................................................. F25D 25/00
(52) U.S. Cl. ........................... 62/62; 62/78; 62/394
(58) Field of Search .............................. 62/393, 394, 460, 62/464, 62, 78

(56) References Cited

U.S. PATENT DOCUMENTS

| | | |
|---|---|---|
| 1,478,121 | 12/1923 | Hill . |
| 2,101,261 | 12/1937 | Martin . |
| 2,153,335 | 4/1939 | Martin . |
| 2,162,842 * | 6/1939 | Dolison et al. .................. 62/393 |
| 2,184,380 | 12/1939 | Deibel . |
| 2,187,389 | 1/1940 | Winkler . |
| 2,538,015 | 1/1951 | Kleist . |
| 2,800,776 * | 7/1957 | Woodmansee .................. 62/394 |
| 3,013,402 | 12/1961 | Brooker et al. . |
| 3,456,452 | 7/1969 | Hilbert . |
| 3,605,421 * | 9/1971 | Patrick .......................... 62/394 |
| 3,882,693 * | 5/1975 | Hiller ............................ 62/394 |
| 3,998,070 | 12/1976 | Mueller . |
| 4,124,994 | 11/1978 | Cornelius et al. . |
| 4,265,095 * | 5/1981 | McConachie .................. 62/465 |
| 5,762,129 * | 6/1998 | Elliot ............................ 62/460 |

* cited by examiner

*Primary Examiner*—Ronald Capossela
(74) *Attorney, Agent, or Firm*—Salter & Michaelson

(57) ABSTRACT

An apparatus and method for rapidly cooling a liquid based food, such as soups and the like, includes a fluid circulation device which is inserted into a container holding hot soup in order to cool the same. The fluid circulation device preferably includes a coiled, tubular element which circulates chilled fluid through the soup without the fluid coming into direct contact with the soup. The soup is cooled by continuously flowing chilled fluid through the circulation coil, thereby effecting a heat exchange whereby the chilled fluid absorbs heat from soup as it passes through the fluid circulation device in order to lower the temperature of the soup. The apparatus includes a pump which transports the chilled fluid from a fluid supply, through an inlet line into the circulation device, through the circulation device and into an outlet line which then transports the fluid out of the fluid circulation device. Since a constant supply of chilled fluid is continuously flowing through the coil, the soup is cooled very quickly, and with a minimum amount of effort on the part of kitchen personnel.

23 Claims, 5 Drawing Sheets

RAPID FOOD COOLING APPARATUS AND METHOD OF USE

BACKGROUND OF THE INVENTION

1. Field of the Invention

The present invention generally relates to the field of food preparation and more particularly to a device for rapidly cooling liquid based food such as soups, stews and chowders.

2. Discussion of the Related Art

When cooking large quantities of liquid based food such as soups, stews and chowders, it is important to handle the food properly to prevent it from spoiling. In particular, it is necessary to cool the just-cooked soup rapidly before placing it into a refrigeration unit, such as a cooler or a freezer. If the soup is not properly cooled before it is placed into refrigeration, bacteria may develop in the food. In order to prevent this, government regulations require that soups and the like be cooled from approximately 180° to approximately 40° in no more than six hours. When dealing with small quantities of soup, cooling within the government regulations is usually readily achieved. However, restaurants and food supply outfits often cook large quantities of soup, up to about 50 quarts in a single stock pot, which makes cooling according to the government regulations difficult. In order to cool soups in compliance with the government regulations, the food preparation industry has developed several methods to cool large quantities of soups.

One method involves using a paddle or glove which is filled with water and frozen. The soup is stirred with the paddle or glove until it is cooled to the proper temperature. However, this method is extremely labor-intensive, requiring a person to continuously stir the soup for several hours. Another method involves pouring the soup into a number of shallow containers which are then placed into refrigeration. This method requires large amounts of space and is not a reliable method for effectively cooling the soup. A third method involves placing the entire stock pot into an ice bath to cool the soup. Again, this method can take up large amounts of space in the kitchen, and is not consistently effective. Yet another method involves cooking the soup with less than the required amount of liquid, and then adding the remaining liquid at the end of the cooking time in the form of ice to cool the soup. This method is not very time-efficient and also can adversely affect the flavor and consistency of the soup.

What is needed therefor, is an apparatus and method for cooling soups and the like which is convenient, space-efficient, requires minimum labor, and which consistently and effectively cools the soup.

SUMMARY OF THE INVENTION

In accordance with the present invention, there is provided an apparatus and method for rapidly cooling liquid based foods, such as soups and the like, the apparatus including a portable and reusable fluid circulation device which is inserted into a container holding the hot soup in order to cool the same. The fluid circulation device preferably includes a coiled, tubular element which circulates chilled fluid through the soup, without the fluid coming into direct contact with the soup. The soup is cooled by continuously flowing the chilled fluid through the circulation coil, thereby effecting a heat exchange whereby the chilled fluid absorbs heat from the soup as it passes through the fluid circulation device, thereby lowering the temperature of the soup. The apparatus includes a pump which transports the chilled fluid from a fluid supply, through an inlet line into the circulation device, through the circulation device and into an outlet line which then transports the fluid out of the fluid circulation device. Since a constant supply of chilled fluid is continuously flowing through the coil, the soup is cooled very quickly, and with a minimum amount of effort on the part of kitchen personnel.

According to one embodiment, the fluid supply is preferably a container which is sized to hold the pump and a predetermined amount of ice, such that as the ice melts, the pump transports the fluid from the container and into the input line which is connected to the fluid circulation device. A second source of fluid may also be connected to the container in order to replenish the fluid supply within the container as fluid is being emptied from the container and into the circulation device. The second source thereby allows the container to provide a continuous supply of fluid to the fluid circulation device.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE ILLUSTRATIVE EMBODIMENTS

Figure 1:
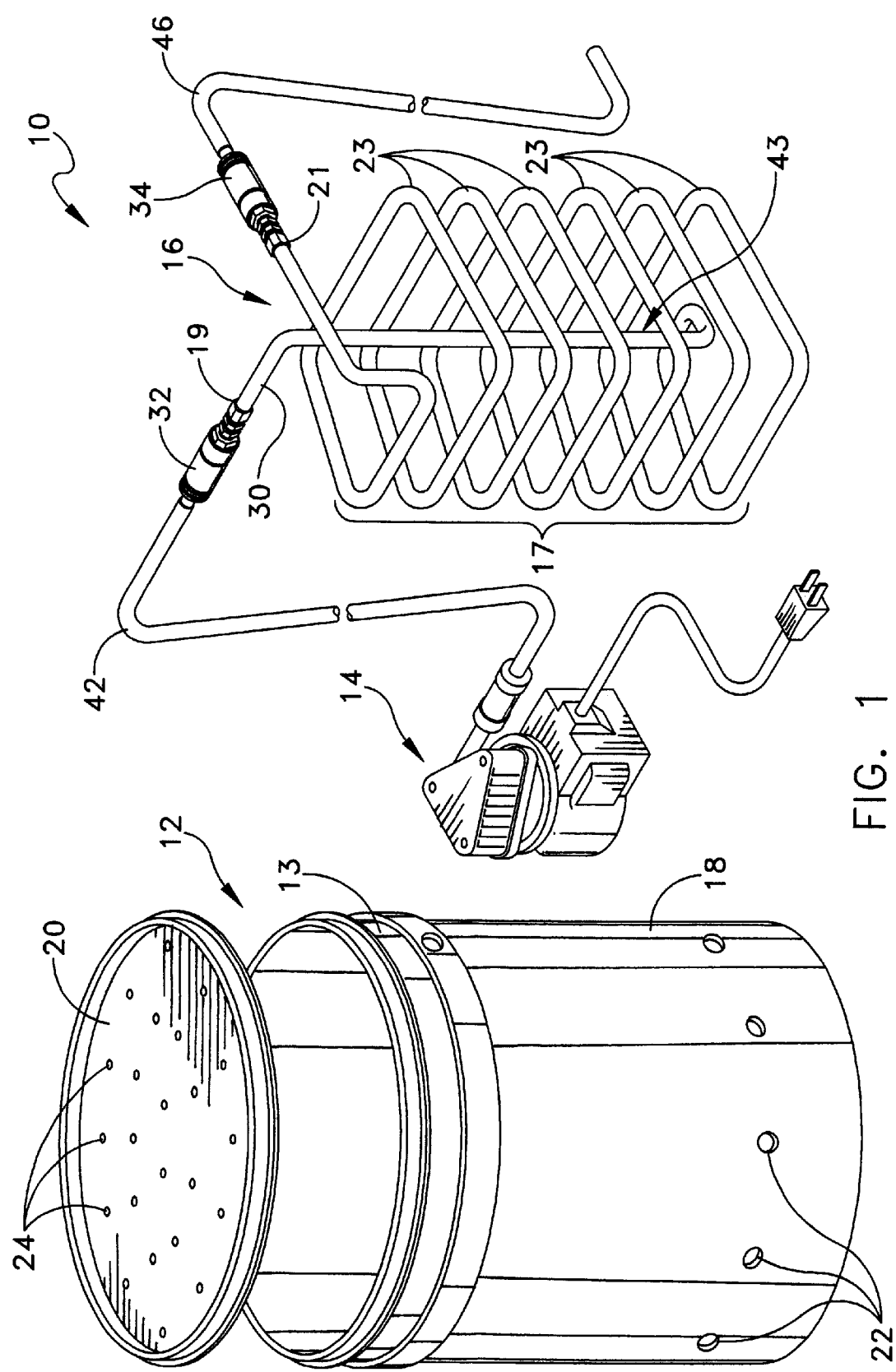
FIG. 1 is a perspective view of the present invention, showing the components in an exploded fashion.

An apparatus 10 for cooling or chilling liquid based foods is illustrated in FIGS. 1–5. The apparatus 10 includes a fluid supply 12, a pump 14 and a fluid circulation device 16. In the present embodiment, the fluid circulation device 16 is constructed from a length of tubing 30 which is preferably formed into a coil 17. Coil 17 includes a first end 19 that is attached by coupling 32 to an input line 42 which is in fluid communication with the fluid supply 12 for transporting fluid into the coil, as described in greater detail below. The coil also includes a second end 21 which is attached by coupling 34 to an output line 46 for transporting the used fluid out of the coil. Input and output lines 42 and 46 may preferably be formed from ¼" plastic tubing, due to the flexibility of such tubing. However, it will be understood that any suitable size and type of tubing may be utilized as would be known to those of skill in the art.

As can be seen from the figures, the coil 17 is preferably configured such that fluid entering the coil 17 through the input line 42 flows through a central portion of the coil 43, in a downward direction to the bottom of the container or pot 50 holding the soup (FIG. 5), and then in an upward direction through the many turns 23 of the coil 17 to the output line 46. The coil may take any number of shapes, and be any of a variety of sizes with few or numerous turns, although it is desirable that the coil fit into standard size stock pots, for example a 50 quart pot, A) and be of sufficient size to cool soup contained within the pot within the government guidelines. In the present embodiment, the overall length "l" of the coil is from about 18–19 inches, the width "w" is from about 8–9 inches, and there are about 6–8 turns, for use with a standard 50 quart stock XTB pot. The tubing forming the coil is preferably formed from ¼" diameter stainless steel, due to the material's resistance to corrosion and the ease with which it can be cleaned, although other size and types of material may be utilized as would be known to one of skill in the art.

The fluid supply 12, which is used to supply the chilled fluid to the coil, may preferably include a container having a body portion 18 which is suitably sized to hold a sufficient supply of ice or chilled fluid, for example a typical 15 gallon bucket, although other sizes may readily be utilized. The body portion may include at least one side wall 25, an open top 27 and a closed bottom 29 which together form the body portion, the body portion also having an interior sized to hold the pump 14 and fluid sufficient to circulate through the fluid circulation device. The body may also include a number of apertures 22 located around the periphery of the bottom of the body portion 18 in order to provide drainage of excess water from the body portion. For a 15 gallon bucket, the drainage holes may preferably be located about 5 inches from the bottom of the container, although the use and placement of drainage holes is optional. The container may also include a lid 20 having a number of apertures 24 arranged therethrough which are used to supply additional fluid to the body of the container, as will be described in greater detail below.

Figure 2:
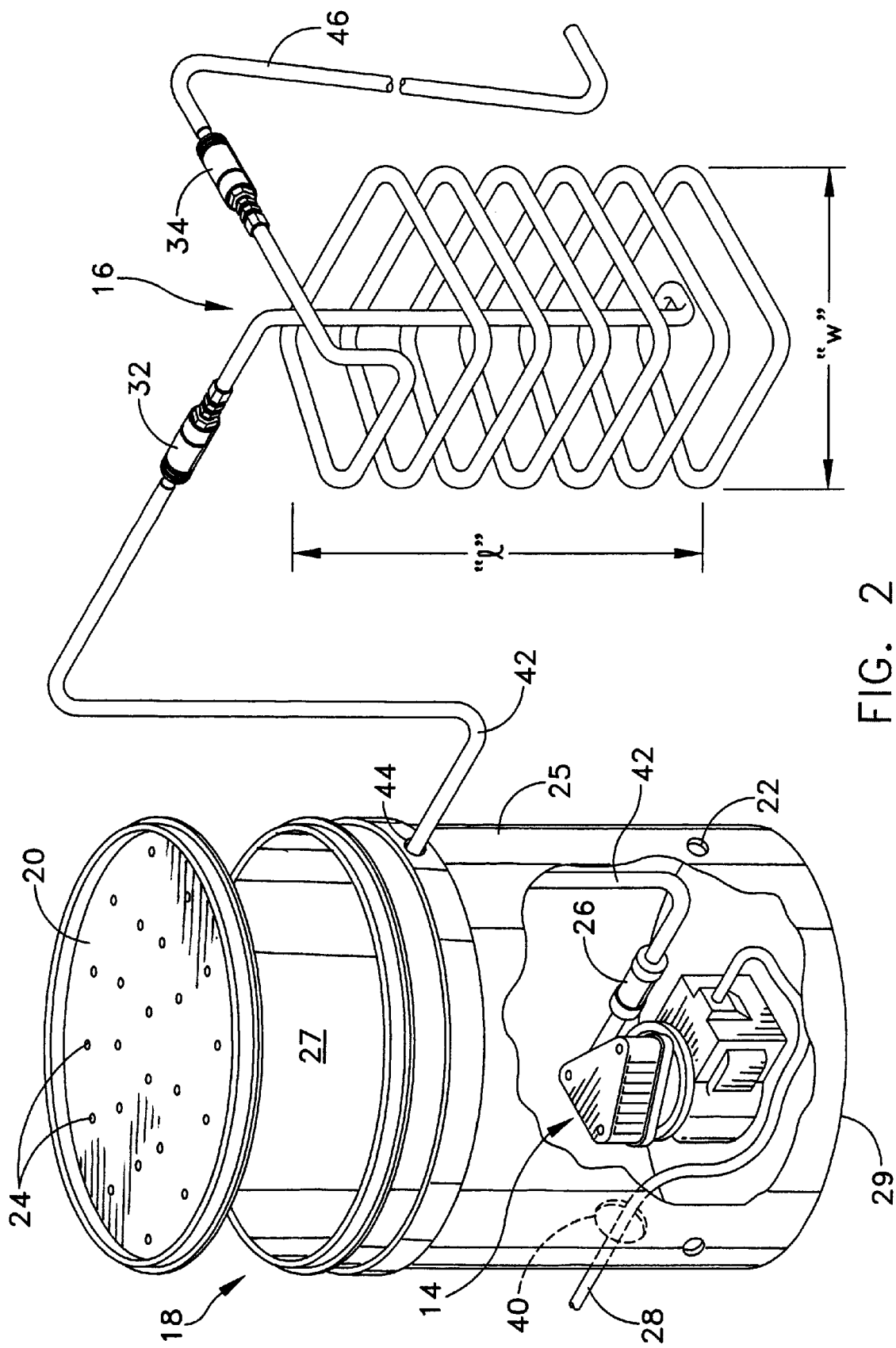
FIG. 2 is a perspective view of the present invention, showing the pump located within a fluid supply container.

Submersible pump 14 may be any style conventional submersible pump which is available through home supply or hardware stores, and which is small enough to fit inside of the body portion 18 of the container, below any apertures 22, in the assembled state as shown in FIG. 2. Pump 14 includes a fluid input (not shown), a fluid output 26 and a power cord 28 which is fed through a first aperture 40 in the container and plugged into a standard electrical outlet (not shown) during use. The fluid output 26 of the pump is attached to input line 42, which is fed through a second aperture 44 in the body portion 18 and then attached to input coupling 32 for connection to coil 17. The operation of the food cooling apparatus 10 will now be described with reference to FIGS. 3–5.

Figure 3:
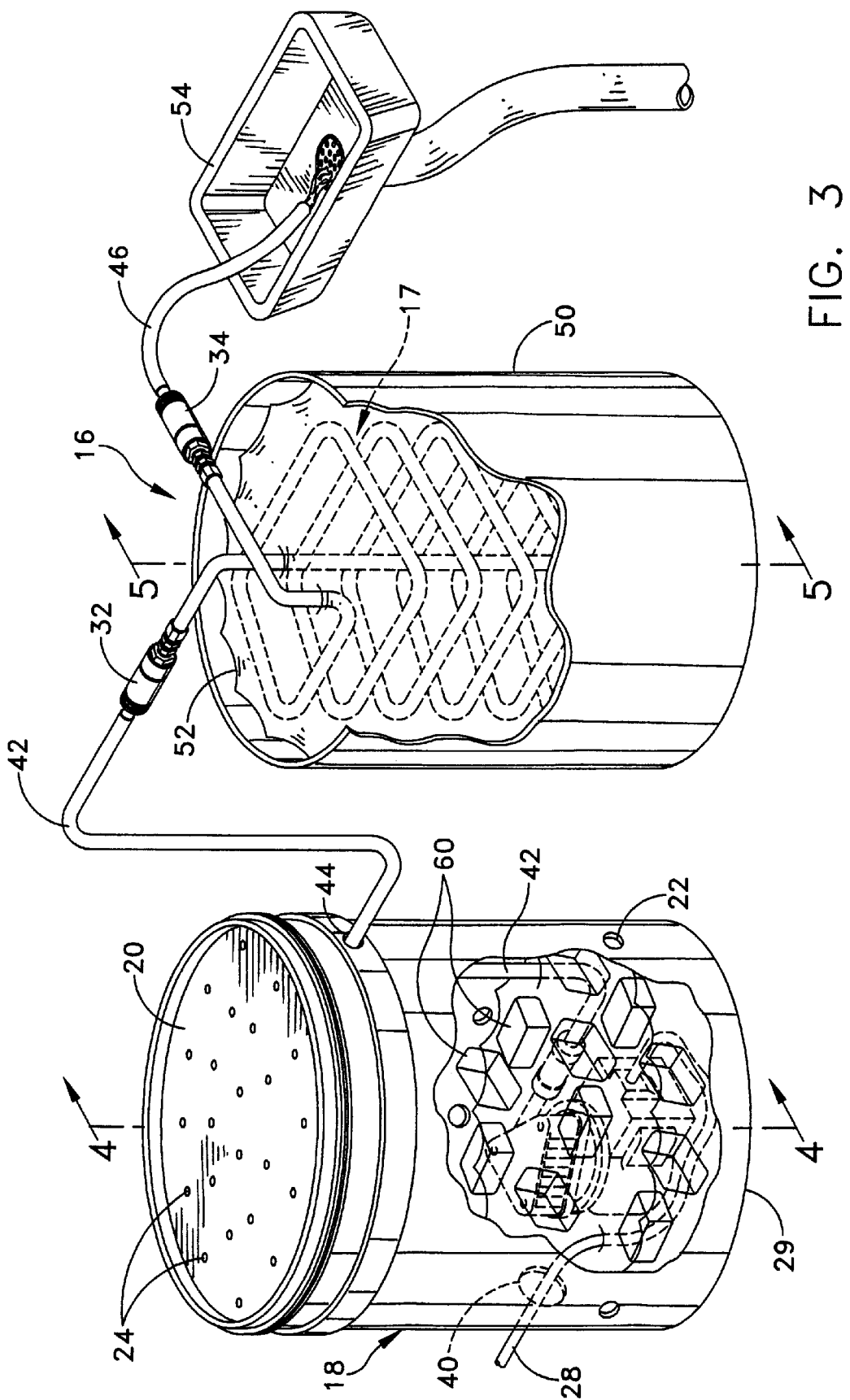
FIG. 3 is a perspective view of the present invention, showing the invention in use.
Figure 4:
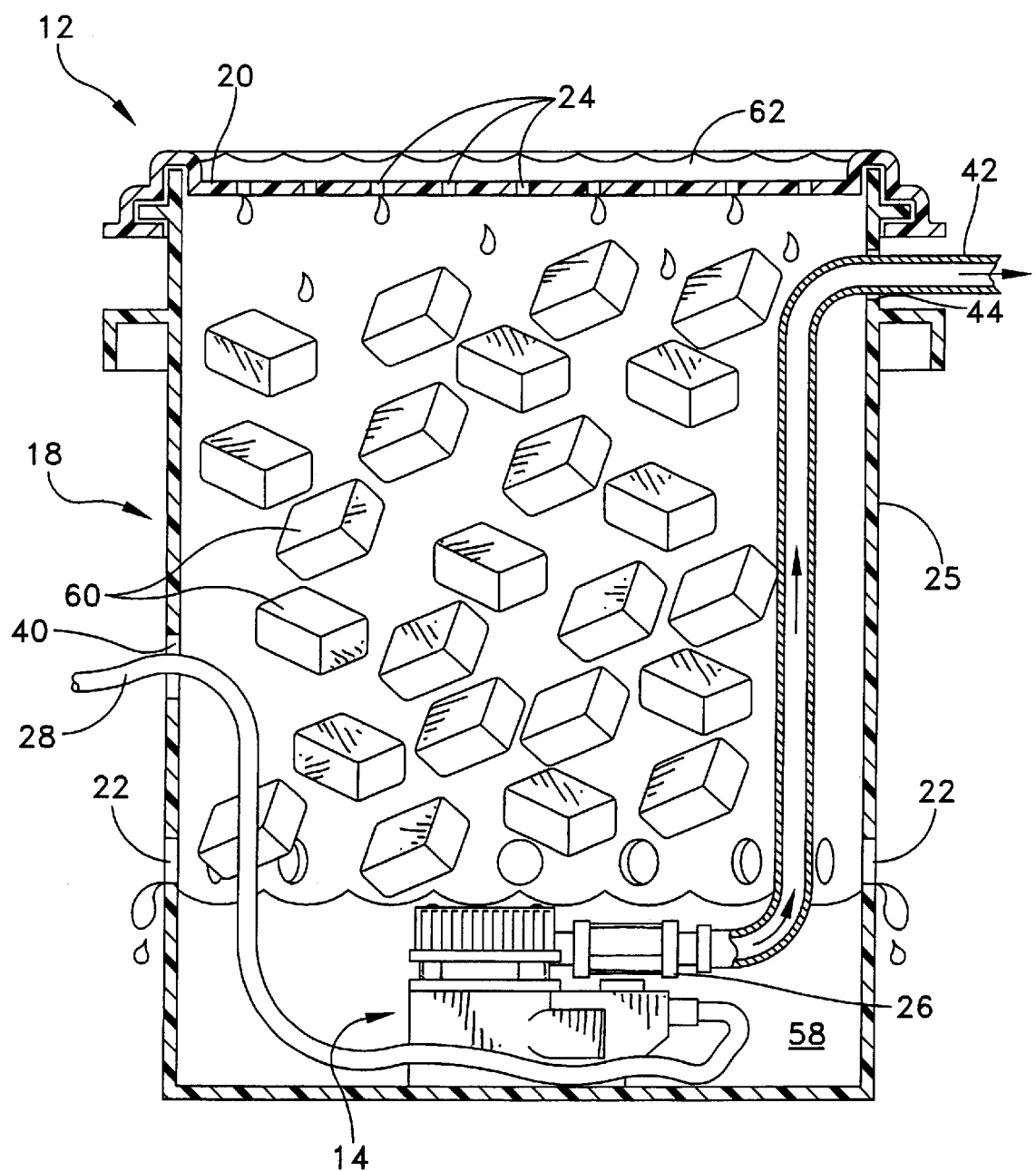
FIG. 4 is a cross-sectional view of the supply container of the present invention, taken along line 4—4 in FIG. 3.
Figure 5:
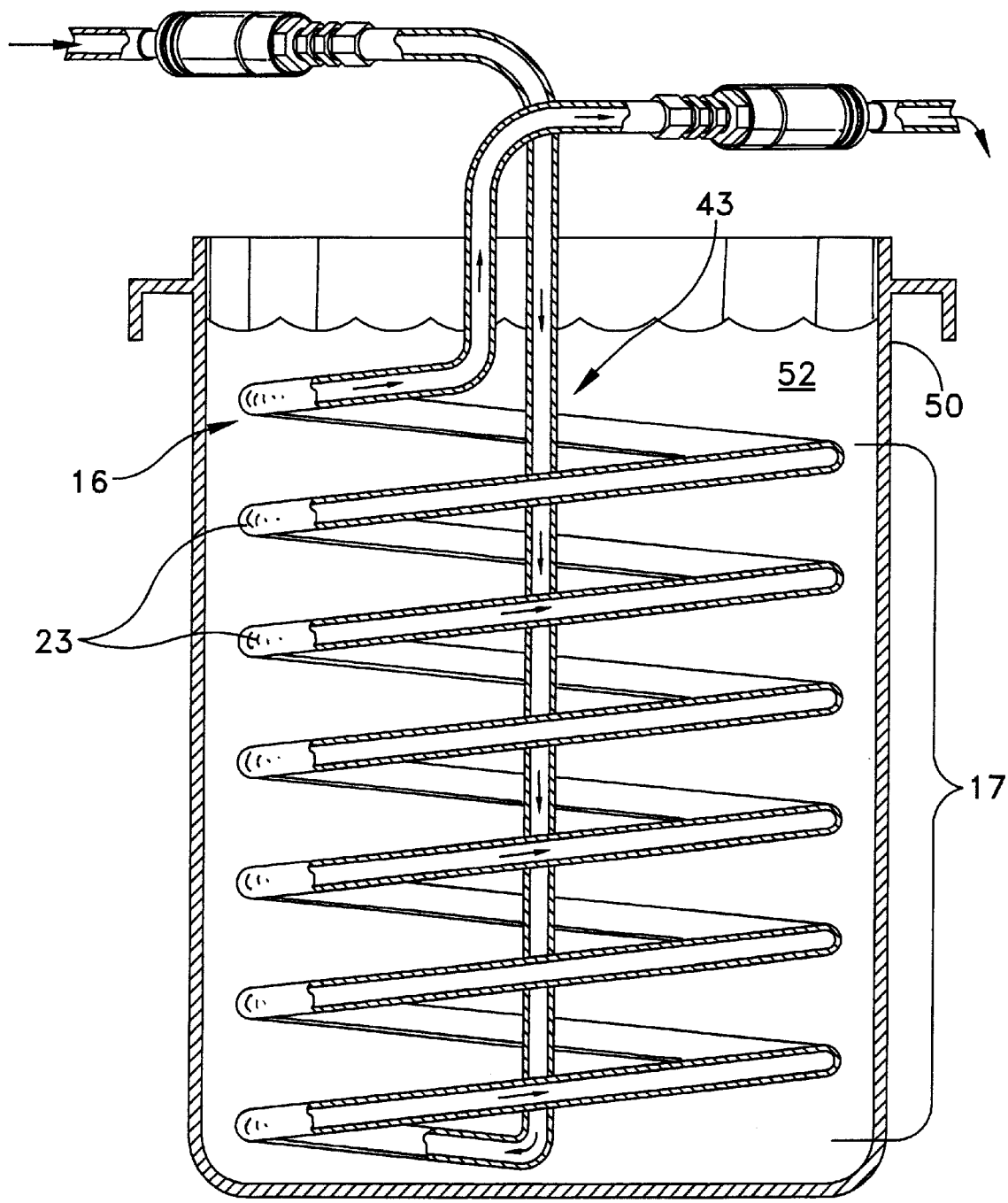
FIG. 5 is a cross-sectional view of the fluid circulation coil of the present invention, taken along line 5—5 in FIG. 3.

As shown in FIGS. 3 and 4, the pump 14 is placed within the body portion 18 of the fluid supply 12 below apertures 22, and is assembled as described above with reference to FIG. 2.

The body portion 18 is preferably filled with water 58 to about the level of the apertures 22. The remaining volume of the body portion 18 is preferably filled with ice cubes 60. The lid 20 is then firmly attached to the top of the body portion 18. An external fluid source (not shown) outputs a supply of fluid, such as water, 62 onto the top of lid 20 which drips or flows into the body portion 18 through the apertures 24. The combination of the supply of fluid 62 and the melting ice cubes 60 ensures that the water 58 at the bottom of the body portion 18 is maintained just above the freezing point. The fluid 62 may be continuously supplied to the lid 20 so that body portion contains a sufficient supply of chilled fluid at all times to pump into the fluid circulation device, the amount of fluid supplied 62 being dependent on the throughput of the pump 14 which can vary, and which is easily ascertained through routine experimentation. As shown in FIG. 4, any excess water in the body portion 18 is drained outside of the body portion 18 through the apertures 22.

The fluid output 26 of the pump is then attached to one end of input line 42 which is coupled at its opposite end to a first, input end of coil 17. Likewise, one end of output line 46 is coupled to a second, output end of the coil, the other end of the output line being placed in communication with a drain (FIG. 3). The coil 17 is then placed into a container, such as stock pot 50, which includes a quantity of soup or other liquid based food 52 that has recently completed cooking.

In operation, as the ice melts and water is supplied to the container, the pump 14 draws the chilled water 58 from the body portion 18 into its fluid input (not shown) and pumps it through its fluid output 26 into input line 42, as shown by the arrows within tubing 42 in FIG. 4. The water is then fed through coil 17 into output line 46 and to drain 54 (FIG. 3). The water exiting the device into drain 54 is at a temperature of approximately 140° F., while the chilled To water supplied to the fluid circulation device is just above freezing, i.e. 32° F.

Therefore, as the iced or chilled fluid 58 is pumped through the coil 17, the coil 17 acts as a heat exchanger and absorbs heat from the soup 52 and draws it away in the fluid which is exhausted through line 46. Since the system 10 is not a closed system, the temperature of the fluid 58 passing through the coil 17 is always just above the freezing point. Tests of the system 10 have shown that a 50 quart stock pot of soup at 212° can be chilled to approximately 50° in approximately 45 minutes.

It can therefore be seen from the above description that the present invention provides a food chilling system which is capable of cooling liquid based foods at a much faster rate and in a more convenient manner than prior art methods. This results in a safer product, since bacteria has much less of a chance to propagate, and greatly reduces the amount of time required to cook and store a pot of soup. Furthermore, since the coil 17 is easily detachable from the rest of the system, it can be quickly washed in a dishwasher or by hand and be reused use almost immediately. Also, the system is inexpensive to make and operate, and requires very little manpower to operate once the system is set up.

It will be understood that various modifications may be made to the embodiment disclosed herein. For example, fluids other than water and ice may be utilized with the system to cool the soup, and the food circulation device may take other shapes, be other sizes and be constructed of other materials than those described above, as would be known to one of skill in the art. The coil may be directly connected to the pump and may serve as the output as well, thus eliminating the separate input and output lines. In addition, the coil may be placed into a stock pot or any other container which contains the hot liquid. Therefore, the above description should not be construed as limiting, but merely as exemplifications of a preferred embodiment. Those skilled in the art will envision other modifications within the scope spirit of the invention.

What is claimed is:

1. A portable apparatus, comprising:
   a liquid-based food contained within a container, the liquid based food having a first temperature range;
   a fluid supply constructed and arranged to provide a fluid within a second temperature range which is lower than the first temperature range;
   a detachable fluid circulation device constructed and arranged to be insertable into and removable from the container, the fluid circulation device including an input end and an output end, the input end in fluid communication with the fluid supply and the output end in fluid communication with a discharge outlet; and a pump constructed and arranged to transport the fluid from the fluid supply through the fluid circulation device, and into the discharge outlet;

wherein upon placing the fluid circulation device within the container and tuning the pump to an operative position, fluid at the second temperature is transported by the pump from the fluid supply, through the fluid circulation device, and discharged from the discharge outlet, such that heat is absorbed from the hot liquid based food by the fluid as it passes through the fluid circulation device thereby cooling the liquid based food.

2. The system of claim 1, wherein the fluid supply comprises a fluid supply container constructed and arranged to hold the fluid and to supply the fluid within the second temperature range.

3. The system of claim 2, wherein the fluid supply container includes a body portion having at least one side wall, an open top and a closed bottom end which define an interior of the body portion, the interior being constructed and arranged to hold the pump and the fluid therein.

4. The system of claim 3, wherein the fluid supply container further includes a lid constructed and arranged to cover the open top of the body portion, the lid having a top surface and a bottom surface with a plurality of apertures formed therebetween, the apertures being sized to provide fluid communication between a second source of fluid disposed on the top surface of the lid and the interior of the body portion.

5. The system of claim 3, wherein the fluid supply container includes a plurality of drainage apertures disposed about a periphery of the container at a predetermined distance from the bottom.

6. The system of claim 1, wherein the fluid circulation device comprises a length of tubing formed into a coil and having an input end in fluid communication with an input line, the input line being in fluid communication with the pump, and an output end in fluid communication with the discharge outlet.

7. The system of claim 1 in combination with the fluid within the first temperature range.

8. The system of claim 7, wherein the fluid is ice water.

9. The system of claim 1, wherein the outlet is a drain.

10. The apparatus of claim 1, wherein the container has a volume of about 50 quarts.

11. The apparatus of claim 10, wherein the apparatus is constructed and arranged to reduce the temperature of the liquid-based food from the first temperature range by about 100° F. within a period of less than about 60 minutes.

12. The apparatus of claim 10, wherein the apparatus is constructed and arranged to reduce the temperature of the liquid-based food from the first temperature range by about 150° F. within a period of about 45 minutes.

13. The apparatus of claim 1, wherein the first temperature range is about 180° F. to about 212° F.

14. The apparatus of claim 1, wherein the first temperature range is about 140° F. to about 190° F.

15. The apparatus of claim 1, wherein the apparatus is constructed and arranged to reduce the temperature of the liquid-based food from the first temperature range by about 100° F. within a period of less than about 60 minutes.

16. The apparatus of claim 1, wherein the apparatus is constructed and arranged to reduce the temperature of the liquid-based food from the first temperature range by about 150° F. within a period of about 45 minutes.

17. A method of cooling a liquid based food comprising the steps of:

providing a liquid-based food contained within a container, the liquid based food having a first temperature range;

providing a fluid within a second temperature range which is lower than the first temperature range;

placing a fluid circulation device into the container;

circulating the fluid at the first temperature through the fluid circulation device such that the fluid does not contact the liquid based food, and wherein heat is absorbed from the liquid based food by the fluid at the second temperature as it passes through the fluid circulation device, thereby cooling the liquid based food; and exhausting the fluid from the output end of the fluid circulation device and to the outlet after the fluid has absorbed heat from the liquid based food.

18. The method of claim 17, further comprising the step of providing a continuous supply of fluid within the second temperature range.

19. The method of claim 17, wherein the container has a volume of about 50 quarts.

20. The method of claim 19, wherein the temperature of the liquid based food is reduced by at least about 100° F. within a time period of less than about 60 minutes.

21. The method of claim 19, wherein the temperature of the liquid based food is reduced at least about 150° F. within a time period of about 45 minutes.

22. The method of claim 17, wherein the temperature of the liquid based food is reduced by at least about 100° F. within a time period of less than about 60 minutes.

23. The method of claim 17, wherein the temperature of the liquid based food is reduced at least about 150° F. within a time period of about 45 minutes.

* * * * *